United States Patent
Das et al.

(10) Patent No.: US 6,768,494 B1
(45) Date of Patent: Jul. 27, 2004

(54) INTERPOLATING OBJECTS TO AVOID HUE SHIFTS

(75) Inventors: Sujata Das, San Jose, CA (US); Michelle R. Dalton, Bainbridge Island, WA (US)

(73) Assignee: Adobe Systems, Incorporated, San Jose, CA (US)

( * ) Notice: Subject to any disclaimer, the term of this patent is extended or adjusted under 35 U.S.C. 154(b) by 0 days.

(21) Appl. No.: 09/499,266

(22) Filed: Feb. 7, 2000

(51) Int. Cl.[7] .................................................. G09G 5/02
(52) U.S. Cl. ...................... 345/591; 345/593; 358/520
(58) Field of Search .............................. 345/589–606, 345/549, 556, 543; 382/162, 167; 358/500, 448, 512, 515–538; 348/349, 648, 650

(56) References Cited

U.S. PATENT DOCUMENTS

| | | | | |
|---|---|---|---|---|
| 4,642,678 A | * | 2/1987 | Cok | 348/242 |
| 5,051,929 A | * | 9/1991 | Tutt et al. | 345/593 |
| 5,202,935 A | * | 4/1993 | Kanamori et al. | 382/162 |
| 5,204,737 A | * | 4/1993 | Hakkaku et al. | 358/500 |
| 5,652,831 A | * | 7/1997 | Huang et al. | 345/604 |
| 5,736,989 A | * | 4/1998 | Lhotak | 345/593 |
| 5,900,860 A | * | 5/1999 | Ueda | 345/600 |
| 5,999,279 A | * | 12/1999 | Kouzaki et al. | 358/520 |
| 6,014,457 A | * | 1/2000 | Kubo et al. | 382/167 |
| 6,269,184 B1 | * | 7/2001 | Spaulding et al. | 382/167 |

* cited by examiner

*Primary Examiner*—Michael Razavi
*Assistant Examiner*—Thu-Thao Havan
(74) *Attorney, Agent, or Firm*—Fish & Richardson P.C.

(57) ABSTRACT

A method and system for correcting areas of a page that may produce hue shifts when executing a color conversion process on the page from a source color space to a destination color space. The page includes one or more objects including unspecified color points. The method includes determining when a predetermined amount of hue shift will occur in the color conversion process for the object from the source color space to the destination color space. If the amount of hue shift exceeds the predetermined amount, the method includes generating color data for all unspecified color points in the source color space and color converting the object from the source color space to the destination color space.

30 Claims, 4 Drawing Sheets

INTERPOLATING OBJECTS TO AVOID HUE SHIFTS

The present invention relates generally to computing systems, and more particularly to a method and apparatus for displaying data.

BACKGROUND

A document publishing application can be used for producing content (i.e., a document) to be displayed on an output device. Document publishing applications allow a user to manipulate text, graphics, image and other data forming a document for output on a conventional output device. The document can be described in terms of one or more page description language objects that can be process by the output device. The output device can include a raster image processor (RIP) for transferring the page description language objects into data for display on the output device.

Conventional document publishing applications can produce output in one of a plurality of output formats. Depending on the format type, various other devices can view or manipulate the output. As described above, the document produced by conventional document publishing application can include one or more pages of content, each describing in a page description language (PDL). Example of PDLs include the Portable Document Format™ (PDF™) and PostStcript® both by Adobe Systems, Inc. of San Jose, Calif. Each page can include instructions for specified one or more objects to be painted on the page including specifying colors for the objects. The color specification includes the definition of a source color space to be associated with the object. The output device on which the document, and hence each object, is viewed or printed may support a different destination color space. If the output device does not support the source color space then a transformation may be required to the destination color space. Typically the transformation occurs in an interpreter resident within the output device. The process for converting color data from one color space to another is known in the art.

During the conversion process hue shifts may result. A hue shift is a color shift change that results when converting from one color space to another. Hue shifts are a concern particularly for certain kinds of objects, one example of which is a gradient. A gradient can be used to produce a smooth color transition over a region. Gradients can be specified by their path and a plurality of colors including a starting color, an ending color and zero or more intermediary colors. In PDF, a gradient is produced by interpolating between the specified colors to produce color data for all the non-specified points in the region. If an incorrect color value is used in the interpolation process, the overall colors in the gradient can change significantly. Upon color conversion, if a color value in a gradient's specification gets mapped to a visually incorrect value, the effect of the incorrect value spreads out and may become exaggerated producing an unsightly hue shift.

Problems in the conversion can arise where the source color space is not within the gamut of the destination color space. Color coupling is a process of mapping colors in one space (i.e., source space) to colors available in another space (i.e., destination space). However, where the totality of the colors available is less or different between source and destination space, a closest color (e.g., color coupling) is selected. As described above, if the closest color is visually incorrect, undesirable results may be produced in the interpolation process and hue shifts may arise.

SUMMARY

In one aspect the invention provides a method for correcting areas of a page that may produce hue shifts when executing a color conversion process on the page from a source color space to a destination color space. The page includes one or more objects including unspecified color points. The method includes determining when a predetermined amount of hue shift will occur in the color conversion process for the object from the source color space to the destination color space. If the amount of hue shift exceeds the predetermined amount, the method includes generating color data for all unspecified color points in the source color space and color converting the object from the source color space to the destination color space.

Aspects of the invention can include one or more of the following features. The object can be a gradient defined by a path and a plurality of color values and the step of generating color data can include interpolating between the color values to derive color data for the unspecified color points.

The step of determining can include color converting the gradient to a third color space, color converting the gradient to the destination color space and color converting the gradient in destination color space to the third color space. In the third color space, a distance between each color point for the representations of the gradient produced in the third color space is measured. If the distance between any two points is greater than a predefined distance, then the color conversion process is determined to exceed the predetermined amount.

The third color space can be the CIE Lab color space. The method can include determining if an approximation of the hue shift should be determined. If an approximation of the hue shift is to be determined then the gamut of the destination color space is mapped to a third color space where the third color space has a gamut that is larger than that of the source color space and the destination color. A range of colors for the gradient in the source color space is determined and mapped to the third color space. If the range of colors for the gradient in the third color space is not coextensive with the gamut of the destination color space in the third color space, then determining that the color conversion exceeds the predetermined amount.

The step of mapping the gamut of the destination space can include mapping the extremities of the axes for the destination color space to the third color space forming a first N-dimensional cube. The step of determining a range of colors for the gradient can include determining a smallest n-dimensional cube that contains all of the color values used in the gradient and color converting the corners of the cube to a third color space forming a second N-dimensional cube. The step of determining if the range of colors for the gradient is coextensive can include determining if the second N-dimensional cube is coextensive with the first N-dimensional cube in the third color space.

The step of determining if an approximation of the hue shift should be determined can include determining if the gradient includes a small number of points having unspecified color data. If the amount of hue shift does not exceed the predetermined amount, the method can include color converting the object from the source color space to the destination color space and generating color data for all unspecified color points in the destination color space.

In another aspect, the invention provides a computer implemented method for correcting areas of an page that may produce hue shifts when executing a color conversion process on the page from a source color space to a destination color space. The page includes one or more objects including unspecified color points. The method includes instructions for causing the computer to determine when a predetermined amount of hue shift will occur in the color conversion process for the object from the source color space to the destination color space. If the amount of hue shift exceeds the predetermined amount, color data for all unspecified color points in the source color space is generated and thereafter the object is color converted from the source color space to the destination color space.

Aspects of the invention can include one or more of the following advantages. A system is provided for determining whether or not unacceptable hue shifts will occur in the color conversion of an object. When unacceptable hue shifts are anticipated then the object is processed in the source color space including performing any interpolation of color data. The resultant images are color converted to the destination color space to reduce the effect of the hue shift producing a more localized result.

The details of one or more embodiments the invention is set forth in the accompanying drawings and the description below. Other features, objects and advantages of the invention will be apparent from the description, the drawings and from the claims.

DESCRIPTION OF DRAWINGS

Like reference symbols in the various drawings indicate like elements.

DETAILED DESCRIPTION

Figure 1:
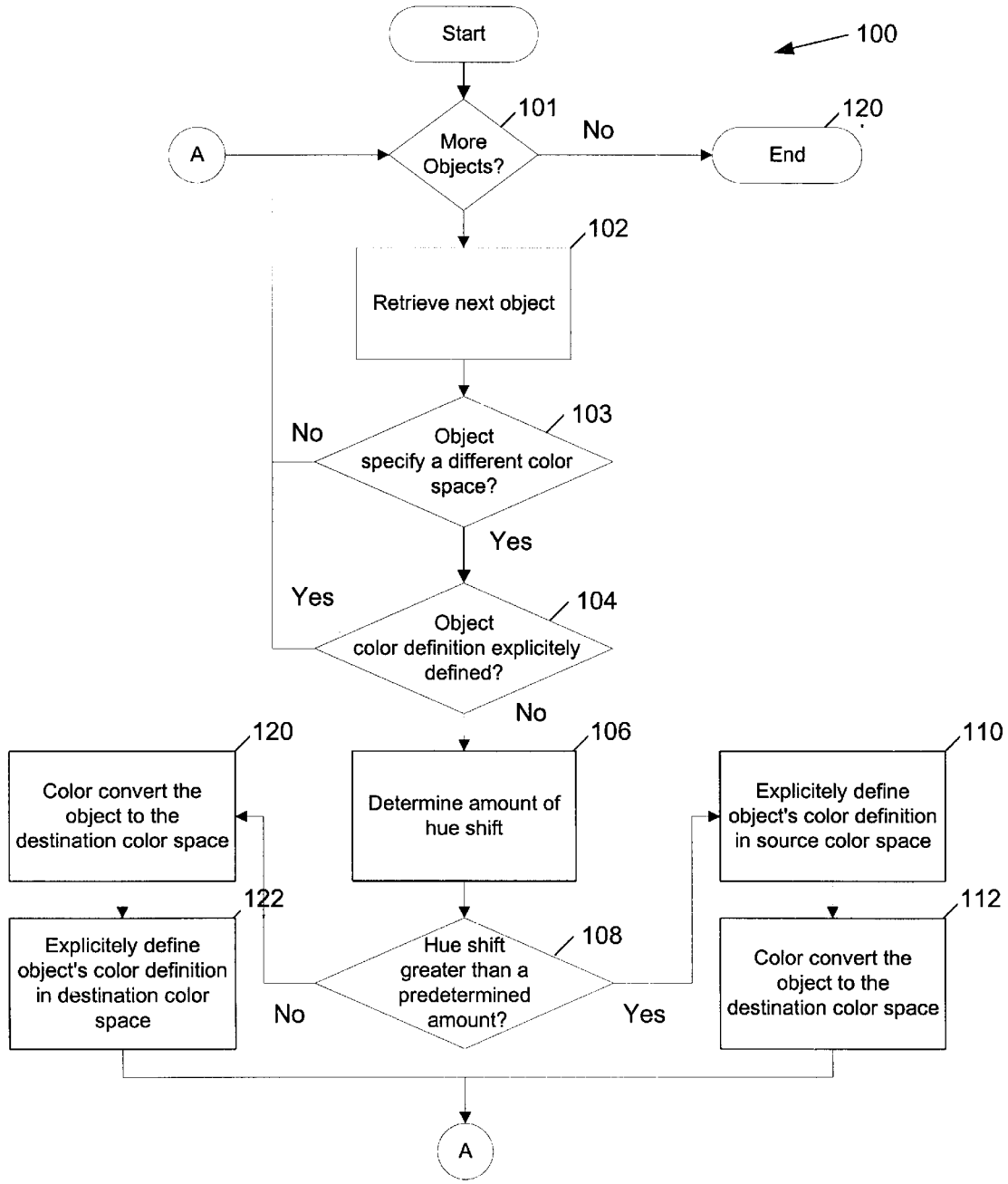
FIG. 1 is a flow diagram of the process for color converting an object to avoid hue shifts.

Referring to FIG. 1, a process 100 for color converting an object to avoid hue shifts is shown. The object is generally associated with a page produced by a document publication application. Examples of document publication applications include Illustrator by Adobe Systems, Inc. of San Jose, Calif. Document publication applications produce as an output a page that can be described by a page description language. The page includes one or more objects each of which can include a color specification. The color specification defines a source color space that is associated with the object, and more particularly with the color data for the object. The page can be printed on an output device that supports a destination color space. As described above, the destination and source color spaces may be different.

The process begins by determining if more objects are to be processed 101. If not, the process ends 120. A next object is retrieved 102 and checked to determine if the object includes a color definition that specifies a source color space that is different from the destination color space associated with the output device on which the page is to be displayed 103. A check is made to determine if the object's color definition in the source color space is specifically defined or includes any unspecified color data that is produced, for example, by interpolating one or more color values to produce an unspecified color 104. A gradient is an example of an object that includes unspecified color data. In Post-Script and PDF, an object can include a color definition that specifies a gradient as a means for defining the color for filling any path/text/graphics.

If the object's color definition has been explicitly defined, then the process continues at step 101. If an object is identified in step 104, the process determines the amount of hue shift that will occur in the color conversion process for converting the object from the source color space to the destination color space 106. If the amount of hue shift exceeds a predetermined amount 108, then the object's color definition is explicitly defined in the source color space including specifying color data in the source color space for any unspecified points in the object 110. The step of specifying color data can include performing an interpolation of color values in the source color space to produce color data for all unspecified points for the object. All the specified color data for the object is then color converted to a destination color space 112. Thereafter, the process continues at step 102.

If the amount of hue shift does not exceed the predetermined amount in step 108, then the object is color converted from the source color space to the destination color space 120. Thereafter, the object's color definition is explicitly defined in the destination color space to produce color data in the destination color space for each point of the object having unspecified color data 122. Thereafter, the process continues at step 101 until all objects for the page have been processed.

Figure 2:
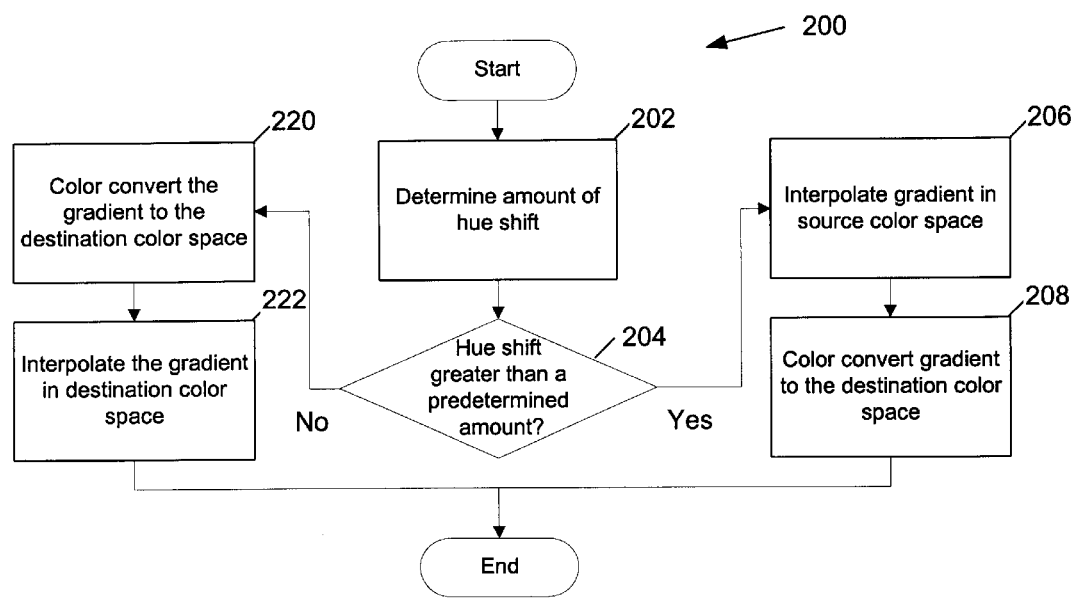
FIG. 2 is a flow diagram of a process for a color converting a gradient to avoid hue shifts.

In one implementation, the process can be invoked to correct for hue shifts when processing a gradient object. In PDF, a gradient object is defined by a path and a color specification. The color specification includes a source color space as well as color values that are to be interpolated between to produce a smooth shading for the object. Referring now to FIG. 2, a process 200 is shown for color converting a gradient having a source color space definition that is different than the destination space associated with an output device on which the gradient object is to be displayed. The process begins by determining an amount of hue shift that will occur in the color conversion process for the gradient 202. If the amount of hue shift exceeds the predetermined amount 204, then the gradient is interpolated in the source color space 206. The process of interpolating the gradient in the source color space produces color data for each point in the gradient in the source color space. The color data for the gradient is then color converted to the destination color space 208.

If the amount of hue shift does not exceed the predetermined amount in step 204, then the gradient is color converted from the source color space to the destination color space 220. The gradient is interpolated in the destination color space to produce color data for each point in the gradient in the destination color space 222. Thereafter, the process ends.

Figure 3:
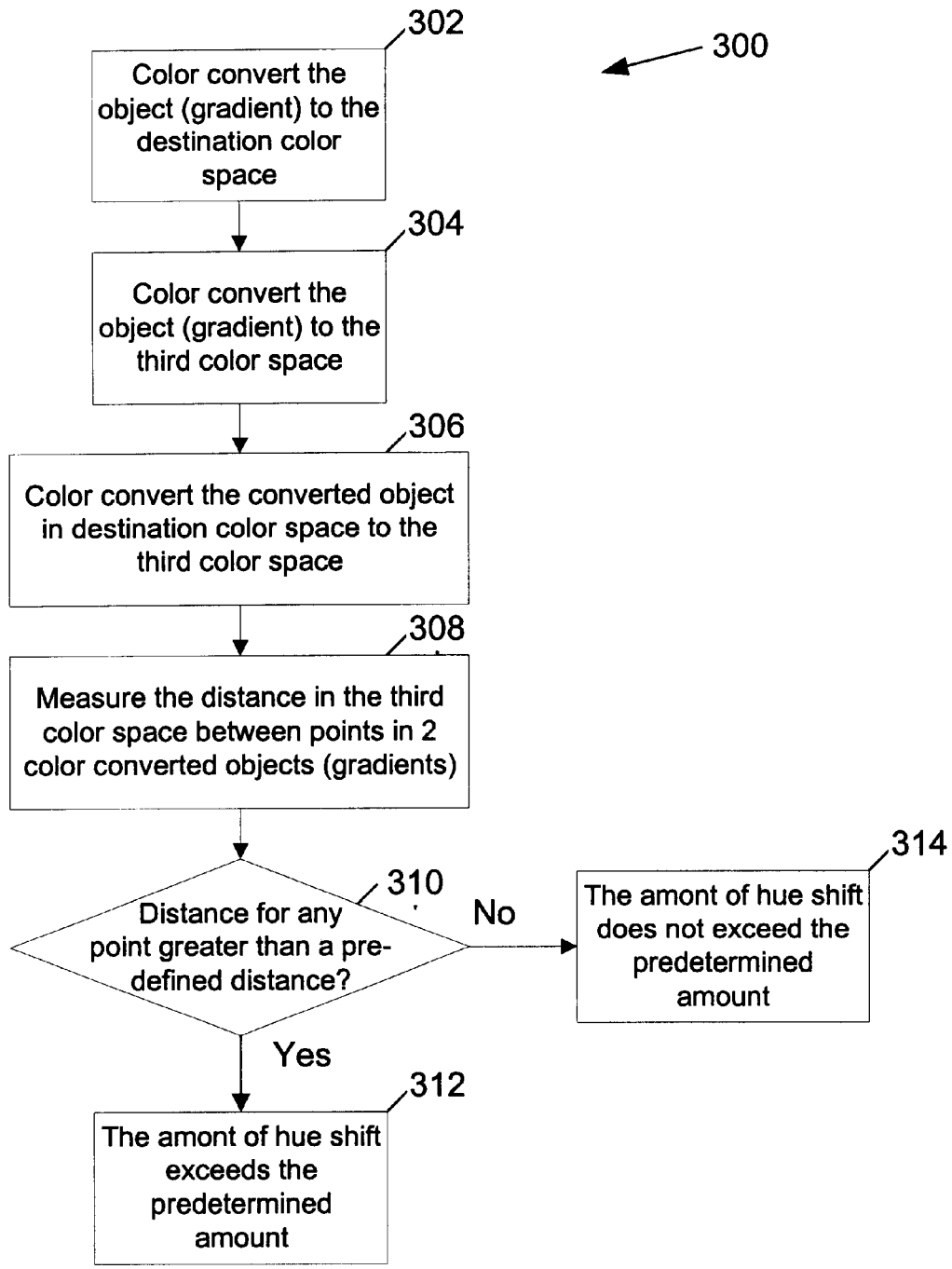
FIG. 3 shows a process for color converting a gradient that has a small number of color points.

Referring now to FIG. 3, in one implementation, the step of determining when a predetermined amount of hue shift will occur includes determining if an approximation should be used. That is, in the evaluation to determine the amount of hue shift, a routine can be invoked (as shown in FIG. 3) for processing all points of an object. Alternatively, an approximation routine (FIG. 4) can be used. In one implementation, the decision as to whether to invoke the approximation routine is made based on the number of points in the object that are to be processed. If the object has a small number of color points, then all are processed in accordance with the method shown in FIG. 3. By small number, we refer to a manageable number of color points that can be processed according to the description herein. In one implementation, the number of color points included in an object having a small number of color points is approximately less than a 256. If an object does not have a small number of color points, then an approximation process 400 is invoked as shown in FIG. 4 for determining if a predetermined amount of hue shift will occur in accordance with step 204 (FIG. 2).

Referring now to FIG. 3, process 300 includes color converting the object (e.g., gradient) in source color space to the destination color space producing an intermediary gradient 302. The object (e.g., gradient) in source color space is similarly color converted to a third color space where the third color space producing a direct color converted object (e.g., gradient) 304. The third color space is different from that of the source and destination color spaces and has an associated gamut that exceeds each of the source and destination color spaces. In one implementation, the third color space is the CIE L*a*b* color space [where CIE stands for the International Committee on Illumination or rather the French name for it (Commission International de l'Eclairage) and L*a*b* as defined by CIE in 1976 refers to the lightness on the uniform lightness scale (L*), the green-red component (a*) and the blue-yellow component (b*)].

The intermediary object (e.g., gradient) is converted to the third color space (e.g., the LAB color space) producing an indirect color converted object (e.g., gradient) 306. In the third color space, a distance between corresponding color points in the direct and indirect color converted objects (e.g., gradients) is measured producing distance data for each color point 308. If the distance associated with a color point is greater than a predefined distance 310, then the color conversion process in step 204 is deemed to exceed the predetermined amount 312. Else, the color conversion process does not exceed the predetermined amount 314.

Figure 4:
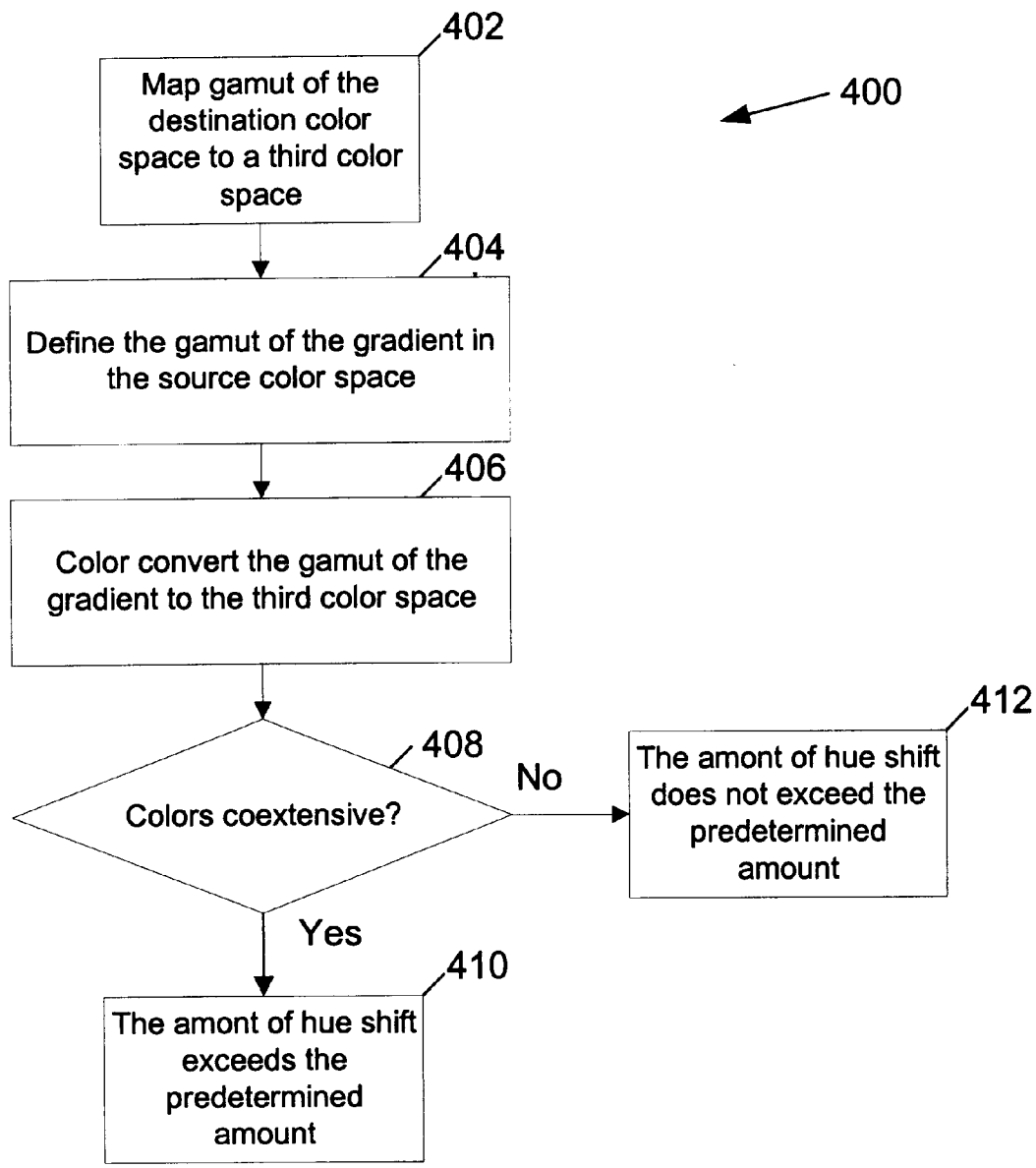
FIG. 4 shows a process for color converting a gradient that has other than a small number of color points.

Referring now to FIG. 4, an approximation process 400 includes mapping the gamut of the destination color space to the third color space 402. The "gamut" of the object (e.g., gradient) is determined 404. By gamut of the object (e.g., gradient), we refer to the range of colors used in the object (e.g., gradient) in source color space. The gamut of the object (e.g., gradient) is color converted to the third color space 406. A comparison is made in the third color space to determine if the colors associated with the object (i.e., the color converted gamut of the object) and the colors associated with the destination color space are coextensive 408. If not, then the hue shift is deemed to exceed the predetermined amount 410. Else, the color conversion process does not exceed the predetermined amount 412.

In one implementation, the mapping of the destination color space to the third color space includes producing a first N-dimensional cube in the third color space defining the gamut of the destination color space in the third color space. In one implementation, the mapping is produced by color converting the extremities of the axes in the destination color space to the third color space.

The step of determining the gamut of the object (e.g., gradient) can include determining a smallest N-dimensional cube (a second N-dimensional cube) in the source color space that contains all of the color values used in the object (e.g., gradient). The corner colors associated with the N-dimensional cube can be color converted to the third color space. The color data for the corners in the third color space can be joined to form a cube (a third N-dimensional cube) in the third color space defining the conversion of the object (e.g., gradient) from the source color space to the third color space. Next a comparison of the first and third N-dimensional cubes is performed. More specifically, a check can be made to determine if the third N-dimensional cube is coextensive with the first N-dimensional cube. If not, then an unacceptable amount of hue shift may be produced and the color conversion for the gradient should be performed after interpolation The methods described may be implemented in hardware, firmware, software, or combinations thereof, or in a computer program product tangibly embodied in a computer readable storage device. Storage devices suitable for tangibly embodying the computer program include all forms of non-volatile memory, including semiconductor memory devices, magnetic disks, magneto-optical disks, and optical disks.

The processes described herein can be executed by a computer system. One such computer system includes a CPU, RAM, and an I/O controller coupled by a CPU bus. The I/O controller is also coupled by an I/O bus to input devices such as a keyboard and a mouse, and output devices such as a monitor.

A typical printer can be driven by the computer system. A printer embodying the invention includes an input/output (I/O) interface for receiving raster input over a cable or network from the host computer which outputs the raster data to the common bus. Error messages and control information relating to the transfer of data is communicated back to the host via the I/O interface. As the raster data is received, it is stored in random access memory (RAM) over the common bus. A microprocessor on the common bus provides the control for supplying the raster data to the print engine controller, which in turn passes the raster data to the electromechanical print engine that applies the image to paper.

The programs for the microprocessor can be permanently stored in a read-only memory (ROM). Input data and all other variable data can be stored in shared RAM.

A standard commercial microprocessor, such as the Motorola 68000 family or the Intel i960 family can be used as the microprocessor. The RAM is built using conventional dynamic random access memory (DRAM) semiconductor chips. Other required components are conventional commercial digital semiconductor chips or application specific integrated circuits (ASICs) known in the art and used with printed circuit interconnection technology.

Variations are within the scope of the following claims. The methods described can be used in processing other objects where other color conversion problems may arise. For example, the methods can be used when color converting an image prior to downsampling. When down sampling, color data for each point in the downsampled image can be produced by interpolating over the color data for the image either before or after color conversion. Depending on the amount of hue shift, the image can be color converted to a destination space before the interpolation portion of the process is invoked. In another example, the methods can be used when color converting a downsampled image. For example, given an undersampled raster, at the time for viewing/sending it to a higher resolution output device, we can make the same decision of whether to upsample/interpolate in source color space or destination color space, depending on the amount of anticipated hue shift.

Each program is preferably implemented in a high level procedural or object-oriented programming language to communicate with a computer system. However, the programs can be implemented in assembly or machine language, if desired. In any case, the language may be a compiled or interpreted language.

Each such computer program is preferably stored on a storage medium or device (e.g., CD-ROM, hard disk or magnetic diskette) that is readable by a general or special purpose programmable computer for configuring and operating the computer when the storage medium or device is read by the computer to perform the procedures described. The system also may be implemented as a computer-readable storage medium, configured with a computer program, where the storage medium so configured causes a computer to operate in a specific and predefined manner.

While the invention has been shown and described with reference to an embodiment thereof, those skilled in the art will understand that the above and other changes in form and detail may be made without departing from the spirit and scope of the following claims.

What is claimed is:

1. A method for correcting areas of a page that may produce hue shifts when executing a color conversion process on the page from a source color space to a destination color space, the method comprising:
   a. describing the page with a page description language such that at least one object includes a plurality of unspecified color points, unspecified color points being points that are not specified with a color in the source color space;
   b. determining when a predetermined amount of hue shift will occur in the color conversion process for the object from the source color space to the destination color space; and
   c. if the amount of hue shift exceeds the predetermined amount,
      i. generating color data for all of the plurality of unspecified color points on the object in the source color space, and
      ii. color converting the object from the source color space to the destination color space.

2. The method of claim 1 wherein the object is a gradient defined by a path and a plurality of color values and the step of generating color data includes interpolating between the color values to derive color data for the unspecified color points.

3. The method of claim 2 wherein the step of determining includes
   a. color converting the gradient to a third color space,
   b. color converting the gradient to the destination color space,
   c. color converting the gradient in destination color space to the third color space,
   d. in the third color space, measuring a distance between each color point for the representations of the gradient produced in the third color space; and
   e. if the distance between any two points is greater than a predefined distance, then determining that the color conversion exceeds the predetermined amount.

4. The method of claim 3 wherein the third color space is the LAB color space.

5. The method of claim 2 further comprising
   a. determining if an approximation of the hue shift should be determined;
   b. if an approximation of the hue shift is to be determined then
      i. mapping the gamut of the destination color space to a third color space, the third color space having gamut that is larger than that of the source color space and the destination color;
      ii. determining a range of colors for the gradient in the source color space;
      iii. mapping the range of colors to the third color space;
      iv. determining if the range of colors for the gradient in the third color space is coextensive with the gamut of the destination color space in the third color space;
      v. if the range of colors is not coextensive, then determining that the color conversion exceeds the predetermined amount.

6. The method of claim 5 wherein
   a. the step of mapping the gamut of the destination space includes mapping the extremities of the axes for the destination color space to the third color space forming a first N-dimensional cube,
   b. the step of determining a range of colors for the gradient includes
      i. determining a smallest n-dimensional cube that contains all of the color values used in the gradient, and
      ii. color converting the corners of the cube to a third color space forming a second N-dimensional cube; and
   c. the step of determining if the range of colors for the gradient is coextensive includes determining if the second N-dimensional cube is coextensive with the first N-dimensional cube in the third color space.

7. The method of claim 6 wherein the third color space is the LAB color space.

8. The method of claim 5 wherein the step of determining if an approximation of the hue shift should be determined includes determining if the gradient includes a small number of points having unspecified color data.

9. The method of claim 1 further comprising
   if the amount of hue shift does not exceed the predetermined amount,
      a. color converting the object from the source color space to the destination color space; and
      b. generating color data for all unspecified color points in the destination color space.

10. A computer implemented method for correcting areas of a page that may produce hue shifts when executing a color conversion process on the page from a source color space to a destination color space, the method including instructions for causing the computer to:
   a. describe the page with a page description language such that at least one object includes a plurality of unspecified color points, unspecified color points being points that are not specified with a color in the source color space;
   b. determine when a predetermined amount of hue shift will occur in the color conversion process for the object from the source color space to the destination color space; and
   c. if the amount of hue shift exceeds the predetermined amount,
      i. generate color data for all of the plurality of unspecified color points on the object in the source color space, and
      ii. color convert the object from the source color space to the destination color space.

11. The method of claim 10 wherein the object is a gradient defined by a path and a plurality of color values and the instructions to generate color data include instructions to interpolate between the color values to derive color data for the unspecified color points.

12. The method of claim 11 wherein the instructions to determine include instructions to
 a. color convert the gradient to a third color space,
 b. color convert the gradient to the destination color space,
 c. color convert the gradient in destination color space to the third color space,
 d. in the third color space, measure a distance between each color point for the representations of the gradient produced in the third color space; and
 e. if the distance between any two points is greater than a predefined distance, determine that the color conversion exceeds the predetermined amount.

13. The method of claim 12 wherein the third color space is the LAB color space.

14. The method of claim 11 further comprising instructions to
 a. determine if an approximation of the hue shift should be determined;
 b. if an approximation of the hue shift is to be determined then
  i. map the gamut of the destination color space to a third color space, the third color space having gamut that is larger than that of the source color space and the destination color;
  ii. determine a range of colors for the gradient in the source color space;
  iii. map the range of colors to the third color space;
  iv. determine if the range of colors for the gradient in the third color space is coextensive with the gamut of the destination color space in the third color space;
  v. if the range of colors is not coextensive, then determine that the color conversion exceeds the predetermined amount.

15. The method of claim 14 wherein
 a. the instructions to map the gamut of the destination space include instructions to map the extremities of the axes for the destination color space to the third color space forming a first N-dimensional cube,
 b. the instructions to determine a range of colors for the gradient includes instructions to
  i. determine a smallest n-dimensional cube that contains all of the color values used in the gradient, and
  ii. color convert the corners of the cube to a third color space forming a second N-dimensional cube; and
 c. the instructions to determine if the range of colors for the gradient is coextensive include instructions to determine if the second N-dimensional cube is coextensive with the first N-dimensional cube in the third color space.

16. The method of claim 15 wherein the third color space is the LAB color space.

17. The method of claim 14 wherein the instructions to determine if an approximation of the hue shift should be determined includes instructions to determine if the gradient includes a small number of points having unspecified color data.

18. The method of claim 10 further comprising instructions to
 a. if the amount of hue shift does not exceed the predetermined amount,
  i. color convert the object from the source color space to the destination color space; and
  ii. generate color data for all unspecified color points in the destination color space.

19. The method of claim 1, further comprising:
 detecting the plurality of unspecified color points.

20. The method of claim 10, further comprising instructions to:
 detect the plurality of unspecified color points.

21. A computer program product for correcting areas of a page that may produce hue shifts when executing a color conversion process on the page from a source color space to a destination color space, the product comprising instructions to cause a computer to:
 a. describe the page with a page description language such that at least one object includes a plurality of unspecified color points, unspecified color points being points that are not specified with a color in the source color space;
 b. determine when a predetermined amount of hue shift will occur in the color conversion process for the object from the source color space to the destination color space; and
 c. if the amount of hue shift exceeds the predetermined amount,
  i. generate color data for all of the plurality of unspecified color points on the object in the source color space, and
  ii. color convert the object from the source color space to the destination color space.

22. The computer program product of claim 21 wherein the object is a gradient defined by a path and a plurality of color values and the instructions to generate color data includes instructions to interpolate between the color values to derive color data for the unspecified color points.

23. The computer program product of claim 22 wherein the instruction to determine includes instructions to
 a. color convert the gradient to a third color space,
 b. color convert the gradient to the destination color space,
 c. color convert the gradient in destination color space to the third color space,
 d. in the third color space, measure a distance between each color point for the representations of the gradient produced in the third color space; and
 e. if the distance between any two points is greater than a predefined distance, then determine that the color conversion exceeds the predetermined amount.

24. The computer program product of claim 23 wherein the third color space is the LAB color space.

25. The computer program product of claim 22 further comprising instructions to
 a. determine if an approximation of the hue shift should be determined;
 b. if an approximation of the hue shift is to be determined then
  i. map the gamut of the destination color space to a third color space, the third color space having gamut that is larger than that of the source color space and the destination color;
  ii. determine a range of colors for the gradient in the source color space;
  iii. map the range of colors to the third color space;
  iv. determine if the range of colors for the gradient in the third color space is coextensive with the gamut of the destination color space in the third color space;
  v. if the range of colors is not coextensive, then determining that the color conversion exceeds the predetermined amount.

26. The computer program product of claim 25 wherein
a. the instruction to map the gamut of the destination space includes instructions to map the extremities of the axes for the destination color space to the third color space forming a first N-dimensional cube,
b. the step to determine a range of colors for the gradient includes instructions to
  i. determine a smallest n-dimensional cube that contains all of the color values used in the gradient, and
  ii. color convert the corners of the cube to a third color space forming a second N-dimensional cube; and
c. the instructions to determine if the range of colors for the gradient is coextensive includes instructions to determine if the second N-dimensional cube is coextensive with the first N-dimensional cube in the third color space.

27. The computer program product of claim 26 wherein the third color space is the LAB color space.

28. The computer program product of claim 25 wherein the instruction to determine if an approximation of the hue shift should be determined includes instructions to determine if the gradient includes a small number of points having unspecified color data.

29. The computer program product of claim 21 further comprising instructions where
  if the amount of hue shift does not exceed the predetermined amount,
    a. color convert the object from the source color space to the destination color space; and
    b. generate color data for all unspecified color points in the destination color space.

30. The computer program product of claim 21, further comprising instructions to:
  detect the plurality of unspecified color points.

* * * * *

UNITED STATES PATENT AND TRADEMARK OFFICE
CERTIFICATE OF CORRECTION

PATENT NO. : 6,768,494 B1
DATED : July 27, 2004
INVENTOR(S) : Sujata Das and Michelle R. Dalton It is certified that error appears in the above-identified patent and that said Letters Patent is hereby corrected as shown below:

Column 8,
Line 19, replace "n-dimensional" with -- N-dimensional --;

Column 9,
Line 42, replace "n-dimensional" with -- N-dimensional --;

Column 10,
Line 64, replace "determining" with -- determine --;

Column 11,
Line 6, replace "step" with -- instruction --;
Line 8, replace "n-dimensional" with -- N-dimensional --.

Signed and Sealed this

Twenty-eighth Day of December, 2004

JON W. DUDAS
*Director of the United States Patent and Trademark Office*